June 18, 1968 W. M. HUBBARD ET AL 3,389,337
REGENERATIVE REPEATER USING MULTIMODE OSCILLATOR
Filed July 29, 1965 4 Sheets-Sheet 1
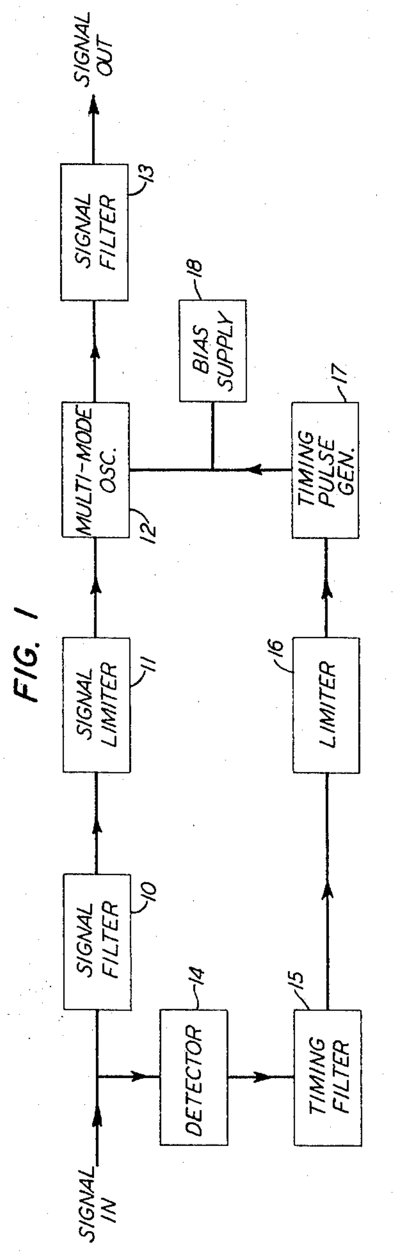
FIG. 1
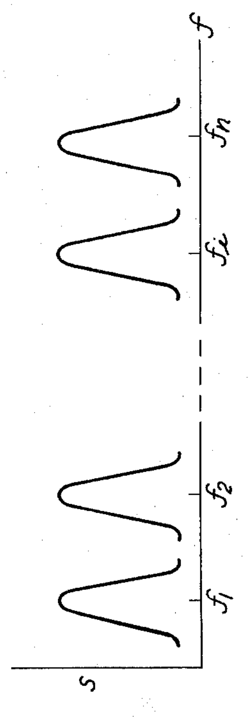
FIG. 2
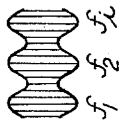
INVENTORS: W. M. HUBBARD
W. D. WARTERS
BY Sylvan Sherman
ATTORNEY

REGENERATIVE REPEATER USING MULTIMODE OSCILLATOR

Filed July 29, 1965 4 Sheets-Sheet 3

3,389,337
REGENERATIVE REPEATER USING MULTIMODE OSCILLATOR

William M. Hubbard and William D. Warters, Middletown Township, Monmouth County, N.J., assignors to Bell Telephone Laboratories, Incorporated, New York, N.Y., a corporation of New York Filed July 29, 1965, Ser. No. 475,758
10 Claims. (Cl. 325—7)

ABSTRACT OF THE DISCLOSURE

This application describes a regenerative repeater wherein signal regeneration is performed by a multimode oscillator and is capable of oscillating at any one of a number of discrete frequencies, but is constrained to oscillate at only one of these frequencies at any given time. The particular frequency at which oscillations occur is determined by a "seeding" signal.

When used as a regenerator in a PCM communication system, the desired frequency of oscillation corresponds to the frequency of the transmitted message signal. The seeding signal is the degraded message signal which includes a component of the transmitted signal.

Timing signals, which are either separately provided or are derived from the message signal, are used to turn the oscillator on and off at time intervals corresponding to the signal pulse width.

This invention relates to regenerative repeaters for use in frequency modulated, pulse code modulation systems.

One of the methods of transmitting data information is to transmit pulses of alternating current wave energy wherein the frequency of the alternating current within each pulse is indicative of the signal condition. For example, in a binary system two different frequencies are used, one of which represents the mark condition, the other of which represents the space condition. Such a system is known alternatively as a frequency modulated, pulse code modulation system (FM–PCM), a frequncy shift keying system (FSK), or simply a frequency-shift system.

Typically in such a system, as in all transmission systems, there is a tendency for the information to suffer a degree of degradation when transmitted over long distances. This can include distortion of the signal amplitude as well as the addition of spurious frequency components. It is, accordingly, advantageous ordinarily to include one or more regenerative repeaters between the transmitting station and the remote receiving station to extract the useful information from the degraded signal and to retransmit it in reconstructed form.

It is the broad object of the present invention to regenerate pulses in a frequency modulated, pulse code modulation transmission system.

It is a more specific object of the present invention to regenerate directly pulses of alternating current wave energy without first detecting the pulses.

In accordance with the present invention regeneration is performed by an oscillator which can oscillate at any one of N frequencies and, in addition, is constrained to oscillate in only one of these modes at a time. When conditions for oscillations are present, the device chooses randomly one of the N modes of oscillation unless a "seeding" signal is present. In the presence of a seeding signal, however, oscillations are established in the mode whose frequency is most nearly that of the seeding signal.

When used as a regenerator, the modes of oscillation of the multimode oscillator correspond to the frequencies of the transmitted message signal. The seeding signal is the degraded message signal which includes a component of the transmitted signal.

Timing signals are separately provided or are derived from the message signal in any one of the methods well known in the art and are used to turn the oscillations on and off at time intervals corresponding to the pulse width.

It is an advantage of the present invention that the regeneration is done directly at the carrier frequency, whereas prior art methods require detectors and wideband baseband circuitry.

These and other objects and advantages, the nature of the present invention, and its various features, will appear more fully upon consideration of the various illustrative embodiments now to be described in detail in connection with the accompanying drawings, in which:

FIG. 1 is a first embodiment of a self-timed regenerative repeater using a multimode oscillator;

FIG. 2 shows the selectivity curve of a multistate oscillator;

Figure 3:
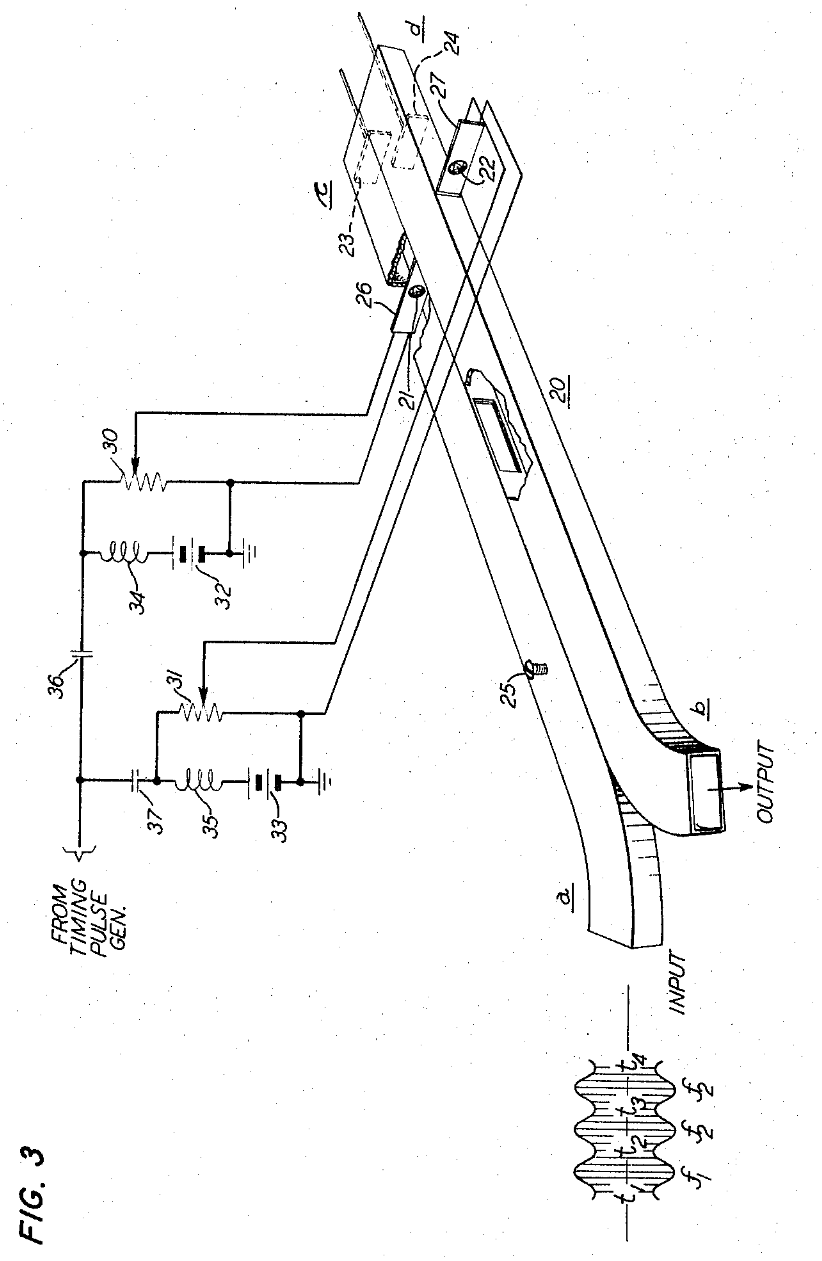
FIG. 3 is an illustrative embodiment of a two element multimode oscillator for use in a waveguide configuration of a binary regenerative repeater.

Referring to the drawings, FIG. 1 shows, in block diagram, a regenerative repeater in accordance with the present invention. Typically, such a repeater includes, in the signal circuit, an input signal filter 10, a signal limiter 11, a multimode oscillator 12, and an output signal filter 13. Such a repeater can also include input and output amplifiers, though these are not shown in FIG. 1.

The timing circuit varies somewhat, depending upon the characteristics of the signal. If the signal input pulses are moderately well resolved so that a timing wave can be derived from an envelope detector, the self-timing arrangement shown in FIG. 1 can be used. This includes an envelope detector 14, a timing signal filter 15, an amplitude limiter 16, and a timing pulse generator 17. Timing signals derived from generator 17 are coupled to oscillator 12, in a manner to be described in greater detail hereinbelow, for the purpose of quenching and initiating oscillations in accordance with the timing information derived from the input signal. Also shown is a bias circuit 18 for supplying bias current or voltage to operate oscillator 12.

Aside from the multimode oscillator, the various circuit elements enumerated above are standard components well known in the art. For a more detailed description of timing circuits see, for example, "The Timing of High-Speed Regenerative Repeaters," by O. E. De Lange, published in the November 1958, Bell System Technical Journal, pages 1455–1486.

The present invention is particularly directed to the use of a multimode oscillator in a regenerative repeater. Such an oscillator has the general property that it oscillates, at any given moment, in one and only one of a multitude of different possible modes. Such a circuit, with two output states, has been described by B. van der Pol in an article entitled "On Oscillation Hysteresis in a Triode Generator With Two Degrees of Freedom," published in Philosophical Magazine, volume 43, pages 700–719, 1922. (Also see "The Non-Linear Theory of Electric Oscillations," by B. van der Pol, Proceedings of the Institute of Radio Engineers, volume 22, pages 1051–1086, September 1934.)

As the possible modes can be a set of fixed, discrete output frequencies, it is proposed that the multimode oscillator can be advantageously used as a regenerative repeater in a frequency shift keying transmission system.

Typically, a multimode oscillator has a selectivity curve of the type shown in FIG. 2. When the circuit is turned on from an off state, oscillations build up from noise at one or all of the possible frequencies $f_1$, $f_2$, or $f_i$. In general, this build up is a random process. In accordance with the invention, however, it is required that the steady-state output be at one and only one of these possible frequencies. Furthermore, it is required that the final mode of oscillation be capable of being selected by the injection, at turn-on, of a small seeding signal near, or at, the appropriate frequency. Thus, through stimulated oscillation or emission, oscillations build up in the desired mode and, simultaneously, oscillations at all the other modes (frequencies) are suppressed.

The necessary conditions for suppressing oscillations in undesired modes are given by W. A. Edson in his paper "Frequency Memory in Multi-Mode Oscillators," published in the Institute of Radio Engineers Transactions on Circuit Theory, volume CT–2, pages 58–66, March 1955. In brief, this property (which Edson calls discrimination) will usually result if all the modes receive energy from the same source and that source is limited in its available output. It is, therefore, an inherent property of many physically realizable circuits which use a driving source common to all modes. In circuits utilizing a negative-resistance device, it results from the nonlinearity of the voltage-current characteristic and, as Edson notes, can be optimized by properly adjusting the characteristic. In quantum systems particular care must be taken that the single driving source requirement is not overlooked. More specifically, this means that the same excited atom is responsible for emission to all modes. Any modes utilizing different sets of excited atoms may oscillate independently.

When used as a regenerative repeater in an FSK system, additional preferred characteristics are imposed upon the oscillation. The most obvious is that the mode frequencies correspond to the transmitted pulse frequencies. Secondly, the frequency selectivity of the oscillator is advantageously more sharply peaked about the mode frequencies than the input spectrum to the repeater. Finally, the oscillation must build up sufficiently rapidly in each time slot to have reached its steady-state frequency (if not its steady-state amplitude) in time to be sampled and then quenched in preparation for the following pulse to be regenerated in the next time slot.

FIG. 3 is an illustrative embodiment of a multimode oscillator for use in a waveguide configuration of a binary regenerative repeater. The oscillator, which comprises a pair of active elements and a power dividing network, is adapted to oscillate at two frequencies which correspond to the two frequencies of the frequency shifted signal pulses that are to be regenerated.

In the particular illustrative embodiment of FIG. 3, the power dividing network is a 3 db quadrature hybrid 20 which has two pairs of conjugate branches *a–b* and *c–d*. Branch *a* is designated the input branch and branch *b* the output branch. Each of the other branches *c* and *d* includes a tunnel diode 21 and 22, and is terminated by means of an adjustable shorting piston 23 and 24, respectively.

The term "3 db quadrature hybrid" refers to that class of power dividing networks in which the power of the incident signal, applied to one branch of one pair of conjugate branches, divides equally between the other pair of conjugate branches and wherein the relative phases of the divided signals differ by ninety degrees. This includes a large variety of power dividing networks among which are the Riblet coupler (H. J. Riblet, "The Short-Slot Hybrid Junction," Proceedings of the Institute of Radio Engineers, volume 40, No. 2, February 1952, pages 180–184), the multihole directional coupler (S. E. Miller, "Coupled Wave Theory and Waveguide Applications," Bell System Technical Journal, volume 33, May 1954, pages 661–719), the semi-optical directional coupler (E. A. J. Marcatili, "A Circular Electric Hybrid Junction and Some Channel-Dropping Filters," Bell System Technical Journal, volume 40, January 1961, pages 185–196), and the strip transmission line directional coupler (J. K. Shimizu in an article entitled "Strip-Line 3 db Directional Couplers," published in the 1957 Institute of Radio Engineers Wescon Convention Record, volume 1, Part 1, pages 4–15). In the illustrative embodiment of FIG. 3, a coupler of the type described by Riblet in the above-noted article is used.

In the usual hybrid junction, every effort is made to achieve balance in the four branches of the junction so that the conjugate branches are isolated from each other. In the present invention, however, an unbalance is deliberately introduced into the network so that there is a small degree of coupling between branches *c* and *d*. In the illustrative embodiment of FIG. 3, a small discontinuity is introduced in branch *a* by some suitable means, such as a screw 25 which extends into branch *a* through the upper wide wall. The hybrid is thus an "imperfect" hybrid.

Diodes 21 and 22 are mounted in branches *c* and *d* in any of the various ways well known in the art. In the illustrative embodiment of FIG. 3, the diodes are mounted on adjustable slab-like holders 26 and 27 in the manner described in United States Patent 2,871,353.

The diodes are biased by means of potentiometers 30 and 31, each of which is connected to a direct current source 32 and 33 through a series choke 34 and 35, respectively.

Branch *c* is terminated by an adjustable shorting piston 23 which is spaced approximately one-quarter wavelength away from diode 21 at one of the two signal frequencies $f_1$. Similarly, branch *d* is terminated by means of a second adjustable shorting piston 24 which is spaced approximately one-quarter wavelength away from diode 22 at the other signal frequency $f_2$.

In operation, the diodes 21 and 22 are biased at points within the negative resistance portions of their respective current-voltage characteristics by means of potentiometers 30 and 31. So biased, the diodes are capable of oscillating, and, if connected to a "perfect" hybrid junction, would each oscillate at the particular frequency determined by the location of the shorting piston in their respective branches and by the bias voltage. In the present case, however, the diodes are deliberately coupled together by virtue of the fact that hybrid 20 is an "imperfect" hybrid junction. So coupled, the diodes act as a unit and together oscillate at only one of the two possible frequencies determined by the piston settings. In the absence of a seeding signal, the oscillations build up in one of the allowed frequencies. At which particular allowed frequency this occurs is a random occurrence. However, when operating as a regenerator, in accordance with the present invention, the frequency at which oscillations occur is determined by the frequency of the signal pulse within each time slot. Thus, for the signal portion illustrated in FIG. 3, oscillations are induced at frequency $f_1$ during time interval $t_1$ to $t_2$; at frequency $f_2$ during time interval $t_2$ to $t_3$; and again at frequency $f_2$ during time interval $t_3$ to $t_4$.

At the end of each time interval, oscillations are quenched by means of a timing pulse derived from timing pulse generator 17. These pulses are coupled to diodes 21 and 22 through capacitors 36 and 37, respectively, and are of sufficient amplitude to momentarily drive the diodes into a positive resistance portion of their current-voltage characteristics. This has the effect of quenching the oscillations, and preparing the oscillator for the next time period. At the termination of the timing pulse, the diodes are again restored to their oscillating state and oscillations again build up at the frequency determined by the next signal pulse. The regenerated pulses are coupled out of the regenerator through branch *b* of junction 20.

Figure 4:
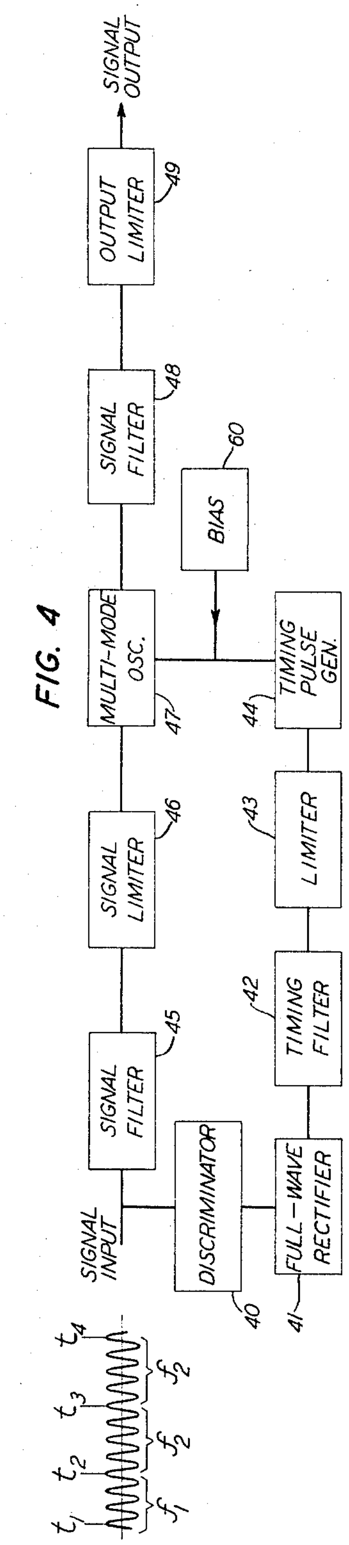
FIG. 4 is a second embodiment of a self-timed regenerative repeater using a multimode oscillator.

FIG. 4 shows, in block diagram, the elements of a self-timed regenerative repeater for use in a constant amplitude FM pulse code modulation system. In such a system the FM pulses are detected in the timing circuit by means of standard discriminator-rectifier techniques. Thus, in FIG. 4, the timing circuit comprises a discriminator 40, a full-wave rectifier 41, a filter 42, a limiter 43 and a timing pulse generator 44. The signal circuit comprises a signal filter 45, a signal limiter 46, a multimode oscillator 47, a second signal filter 48 and an output limiter 49. The oscillator is biased by means of a bias supply circuit 60.

Insofar as the multimode oscillator is concerned, the operation of the embodiment of FIG. 4 is the same as was described in connection with FIGS. 1 and 3. In the embodiment of FIG. 4, signal filter 48 and limiter 49 combine to convert the output pulses from oscillator 47 to constant amplitude FM.

In a third alternative arrangement, timing signals are derived externally, through a separate timing channel, in which case, the timing circuits shown in connection with FIGS. 1 and 4 are not required.

Figure 5:
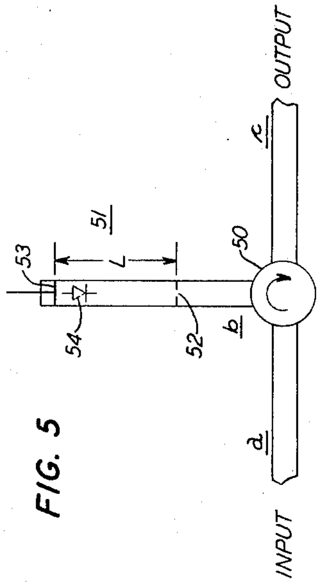
FIG. 5 is an illustrative embodiment of a one element multimode oscillator for use in a regenerative repeater.

FIG. 5 is a second embodiment of a multimode oscillator for use in a regenerative repeater in accordance with the teachings of the present invention. This embodiment utilizes a three-port circulator 50 of which branch *a* is the input branch and branch *c* the output branch. The oscillator, which utilizes one active element, is located in branch *b*. The oscillator comprises a cavity 51 bounded by a fixed discontinuity 52 and an adjustable tuning piston 53.

The active element, which can be a tunnel diode 54, is located within cavity 51 in a region of high electric field intensity.

As is well known, a cavity is capable of supporting oscillations at a plurality of frequencies whose nominal spacing is given by $v/2L$, where L is the cavity length and $v$ the velocity of propagation. Thus, by selecting $v$ and $L$, the oscillator can be designed to support oscillations at the signal frequencies. As before, biasing and timing signals are provided to quench oscillation at the end of each timing interval, and to restore the oscillator to its oscillating state when the quenching signals are removed.

Figure 6:
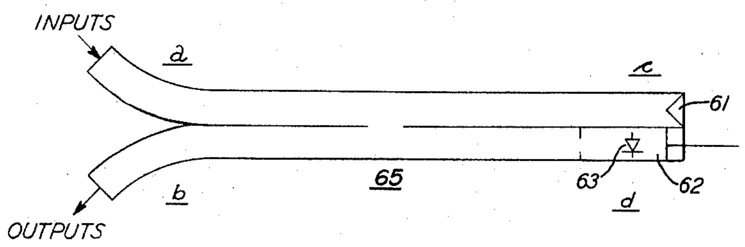
FIG. 6 is a second illustrative embodiment of a one element multimode oscillator.

FIG. 6 is a second waveguide embodiment of a multimode oscillator using only one active element. This embodiment is similar to the embodiment of FIG. 5 with circulator 50 replaced by a directional coupler 65 in which branch *a* is the input branch, and conjugate branch *b* is the output branch of the second pair of conjugate branches, branch *c* is terminated by means of a resistive wedge 61 and branch *d* includes the adjustable, multimode oscillator cavity 62 and diode 63.

In operation the embodiment of FIG. 5 is substantially the same as the embodiment of FIG. 2.

Figure 7:
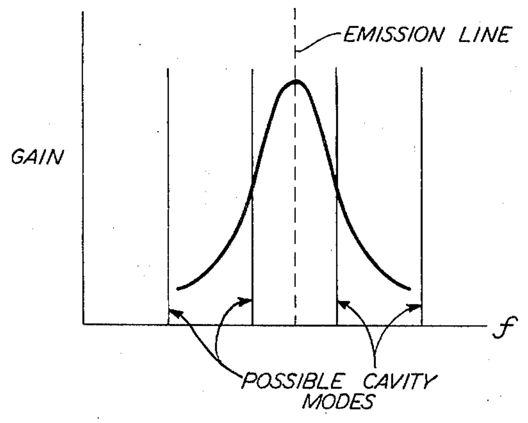
FIG. 7 shows the cavity modes in a laser superposed upon the Doppler-broadened gain curve.

The same technique can be used in connection with other types of oscillators, such as multimode lasers. As is well known, lasers are capable of oscillating at many longitudinal modes depending upon the size of the cavity. Thus, by proportioning the laser cavity, only a limited number of modes can be made to have sufficient gain to oscillate. FIG. 7 shows the various possible cavity resonances for a typical laser, superposed upon the Doppler-broadened gain curve. In this specific illustration, only two of the modes fall within the curve. In addition, they have been situated symmetrically about the emission line. Thus, only excited atoms with a specific magnitude of longitudinal velocity are stimulated to emit. However, an atom which can emit into the upper mode for a wave traveling to the right can also emit into the lower mode for a wave traveling to the left. Since each mode in the cavity is, in fact, a standing wave with travelling waves in both directions, the same atoms drive both modes, and a necessary condition for mode discrimination is satisfied. (See Technical Documentary Report No. AL TDR 64–210 of August 1964, AF Avionics Laboratory, Research Technology Division, Air Force Systems Command, Wright-Patterson Air Force Base, Ohio. Also see "Theory of An Optical Maser," by W. E. Lamb, Jr., The Physical Review, 15 June 1964, volume 134, No. 6A, page A1429.

While some of the illustrative embodiments of the invention were described in connection with binary FM-PCM systems, it is to be understood that the invention is not limited to such systems. It is well known, as indicated in connection with the embodiment of FIG. 5, that oscillators can be made which are capable of oscillating at more than two modes. Hence, the multimode oscillator can just as readily be used in regenerative repeaters in FM-PCM systems operating at three or more frequencies. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A regenerative repeater for use in a frequency shift keying transmission system comprising:
a multimode oscillator adapted to oscillate at only one of a multiplicity of different discrete frequencies in response to excitation by wave energy near said one frequency;
a signal source for delivering signal wave energy to said repeater;
said wave energy characterized by a time sequence of pulses of alternating current in which the wave energy within each pulse includes a band of frequencies distributed about one of said multiplicity of different frequencies;
means for coupling said signal source to said oscillator;
a source of timing signals coupled to said oscillator for turning said oscillator on and off;
and means for coupling pulses of alternating current wave energy out of said oscillator.

2. A regenerative repeater including:
a multimode oscillator adapted to regenerate signal pulses of alternating current wave energy at a multiplicity of different frequencies;
means for coupling pulses of said wave energy to said oscillator thereby inducing oscillations at one of said multiplicity of frequencies during any given pulse;
timing signals for momentarily quenching oscillations in said oscillator at the termination of each pulse period; and means for extracting wave energy from said oscillator.

3. The repeater according to claim 2 wherein said timing signals are derived from said signal pulses at said repeater.

4. The repeater according to claim 2 wherein said timing signals are derived from a separate channel.

5. The repeater according to claim 2 wherein:
said multimode oscillator comprises a tuned cavity resonant to wave energy at said multiplicity of different frequencies, and wherein;
said means for coupling wave energy into said oscillator and said means for coupling wave energy out of said oscillator comprises a circulator having three ports;
one of said ports being an input port;
another of said ports being an output port;
and said oscillator being connected to the port intermediate between said input port and said output port.

6. The repeater according to claim 2 wherein:
said multimode oscillator is a laser having a pair of modes symmetrically displaced about the emission line.

7. A regenerative repeater including:
a dual-mode oscillator adapted to regenerate signal pulses of alternating current wave energy at two different frequencies;

said oscillator comprising a 3 db hybrid junction having two pairs of conjugate branches;

one branch of one pair of conjugate branches being an input branch;

the other branch of said one pair of conjugate branches being an output branch;

an active element disposed in each branch of the second pair of conjugate branches;

adjustable shorting means terminating each branch of said second pair of branches;

means associated with said hybrid junction for introducing a small amount of coupling between the branches of said second pair of branches;

and timing signals for momentarily quenching oscillations in said oscillator at the termination of each pulse period.

8. The repeater according to claim 7 wherein said active elements are tunnel diodes;

and wherein each diode is biased at a point within the negative resistance portion of its current-voltage characteristic.

9. The repeater according to claim 8 wherein said timing signals momentarily drive each of said diodes into a positive resistance portion of its current-voltage characteristic.

10. A regenerative repeater including:

a dual-mode oscillator adapted to regenerate signal pulses of alternating current wave energy at two different frequencies;

said oscillator comprising a 3 db hybrid junction having two pairs of conjugate branches;

one branch of one pair of conjugate branches being an input branch;

the other branch of said one pair of conjugate branches being an output branch;

an active element disposed in a multimode cavity in one branch of the second pair of conjugate branches;

shorting means terminating said one branch of said second pair of conjugate branches;

a resistive termination terminating the other branch of said second pair of conjugate branches;

and timing signals for momentarily quenching oscillations in said oscillator at the termination of each pulse period.

References Cited

UNITED STATES PATENTS 3,187,258 6/1965 Zolnik ---------------- 325—6

ROBERT L. GRIFFIN, *Primary Examiner.*